(12) United States Patent
Ko

(10) Patent No.: US 8,665,585 B2
(45) Date of Patent: Mar. 4, 2014

(54) COVER MECHANISM AND ELECTRONIC DEVICE THEREOF

(75) Inventor: Ping-Yu Ko, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 20 days.

(21) Appl. No.: 13/570,258

(22) Filed: Aug. 9, 2012

(65) Prior Publication Data

US 2013/0215557 A1 Aug. 22, 2013

(30) Foreign Application Priority Data

Feb. 17, 2012 (TW) .............................. 101105265 A

(51) Int. Cl.
*H05K 5/00* (2006.01)
*H05K 7/00* (2006.01)
*G06F 1/16* (2006.01)

(52) U.S. Cl.
USPC ............ 361/679.02; 361/679.26; 361/679.45; 361/679.55; 361/679.56

(58) Field of Classification Search
USPC ............ 361/679.02, 679.26, 679.45, 679.55, 361/679.56
See application file for complete search history.

(56) References Cited

U.S. PATENT DOCUMENTS

| 5,199,888 | A  | * | 4/1993  | Condra et al. ................ | 439/142 |
| 5,738,536 | A  | * | 4/1998  | Ohgami et al. ............... | 439/142 |
| 5,951,310 | A  | * | 9/1999  | Seto et al. ..................... | 439/142 |
| 6,652,297 | B1 | * | 11/2003 | Zhang et al. .................. | 439/136 |
| 6,718,408 | B2 | * | 4/2004  | Esterberg et al. .............. | 710/62 |
| 6,757,160 | B2 | * | 6/2004  | Moore et al. ............. | 361/679.55 |
| 7,382,612 | B2 | * | 6/2008  | Chan et al. ............... | 361/679.41 |
| 7,539,008 | B2 | * | 5/2009  | Chang et al. ............... | 361/679.4 |
| 2010/0103601 | A1 | * | 4/2010 | Wang et al. ............... | 361/679.02 |

* cited by examiner

*Primary Examiner* — Anthony Haughton
(74) *Attorney, Agent, or Firm* — Winston Hsu; Scott Margo

(57) ABSTRACT

A cover mechanism of covering a hole on a casing is disclosed in the present invention. The cover mechanism includes a base, a first holder, a second holder, a cover and a resilient component. The first holder and the second holder are respectively disposed on the base. The cover is pivotably disposed on the first holder. The resilient component includes a shaft and a curved portion. The shaft pivots to the second holder. A first end of the curved portion is connected to the shaft, and a second end of the curved portion pivots to a connecting hole on the cover. The cover drives the curved portion to generate resilient deformation when rotating from a first position to a second position, and a resilient recovering force of the curved portion can be for stopping the cover at the second position.

20 Claims, 8 Drawing Sheets

COVER MECHANISM AND ELECTRONIC DEVICE THEREOF

BACKGROUND OF THE INVENTION

1. Field of the Invention

The present invention relates to a cover mechanism, and more particularly, to a cover mechanism having preferred protection and an electronic device thereof.

2. Description of the Prior Art

A conventional portable electronic device includes a plurality of external sockets for connecting to an external electronic apparatus. The external electronic apparatus can be a mouse, a webcam, an external hard disk that has an USB interface. Therefore, a plurality of holes is formed on a side of the casing of the conventional portable electronic device, and the connecting terminals disposed inside the casing are exposed via the holes. Generally, the conventional portable electronic device further includes a cover made of rubber material, and an engaging structure disposed around the hole on the casing for preventing dust from falling into the external socket that results in damage of the connecting terminals.

As the external socket is not in use, the cover can be stuffed into the engaging structure of the casing for blocking the hole. As the external socket is in use, the cover is pulled to be separated from the engaging structure for exposing the hole. However the conventional cover is engaged with the casing by a resilient recovering force generated from compression. The conventional cover is easy to depart from the engaging structure due to accidental hit or fail assembly, so that the conventional cover can not provide sufficient protection. Thus, design of a protecting mechanism that can drive the cover to open and to close automatically is an important issue of the mechanical industry.

SUMMARY OF THE INVENTION

The present invention provides cover mechanism having preferred protection and an electronic device thereof for solving above drawbacks.

According to the claimed invention, a cover mechanism for covering a hole on a casing includes a base, a first holder, a second holder, a cover and a resilient component. The first holder is disposed on the base. The second holder is disposed on base and adjacent to the first holder. The cover is pivotably disposed on the first holder, and the cover pivots relative to the first holder for rotating from a first position to a second position. A connecting hole is formed on the cover. The resilient component is for constraining the cover at the second position. The resilient component includes a shaft and a curved portion. The shaft pivots to the second holder. A first end of the curved portion is connected to the shaft, and a second end of the curved portion different from the first end pivots to the cover via the connecting hole. The cover drives the curved portion to generate resilient deformation when rotating from the first position to the second position, and a resilient recovering force of the curved portion by the resilient deformation is for stopping the cover at the second position.

According to the claimed invention, the cover mechanism further includes a pin disposed on a pivot hole on the cover. The cover pivots to the first holder by the pin.

According to the claimed invention, the second end of the curved portion is separated from the first end by the resilient recovering force when passing through a line from the first end to the pivot hole.

According to the claimed invention, the cover includes a body, a board and a driving portion. The body pivots to the first holder, and the pivot hole is formed on the body. The board is disposed on a side of the body for covering the hole. The driving portion is disposed on the other side of the body opposite to the board. The connecting hole is formed on the driving portion. The driving portion is connected to the second end of the curved portion for pushing the second end close to the first end, so as to compress the curved portion to generate the resilient deformation.

According to the claimed invention, the second end is separated from the first end by the resilient recovering force of the curved portion, so as to recover the curved portion to an initial state and to rotate the cover at the second position.

According to the claimed invention, the cover further includes a buckling portion connected to a side of the board different from the driving portion and pivotably disposed on a boss of the base.

According to the claimed invention, the cover mechanism further includes a fixing component, and the buckling portion pivots to the boss by the fixing component.

According to the claimed invention, the buckling portion includes at least one first engaging part, the cover mechanism further includes a second engaging part and a spring, the spring is disposed between the second engaging part and the boss for engaging the second engaging part with the first engaging part.

According to the claimed invention, the curved portion includes a first part and a second part, the first part is disposed between the shaft and the second part, the second part is disposed between the cover and the first part, and the first part is connected to the second part in a resiliently curved manner.

According to the claimed invention, the first part and the second part selectively are an arc structures and a bar structures.

According to the claimed invention, an electronic device includes a casing, a connecting terminal and a cover mechanism. A hole is formed on a side wall of the casing. The connecting terminal is disposed inside the casing and faces the hole. The cover mechanism is disposed on the casing for covering the hole. The cover mechanism includes a base, a first holder, a second holder, a cover and a resilient component. The first holder is disposed on the base. The second holder is disposed on base and adjacent to the first holder. The cover is pivotably disposed on the first holder and partly exposed out of the casing. The cover pivots relative to the first holder for rotating from a first position to a second position. A connecting hole is formed on the cover. The resilient component is for constraining the cover at the second position. The resilient component includes a shaft and a curved portion. The shaft pivots to the second holder. A first end of the curved portion is connected to the shaft, and a second end of the curved portion different from the first end pivots to the cover via the connecting hole. The cover drives the curved portion to generate resilient deformation when rotating from the first position to the second position, and a resilient recovering force of the curved portion by the resilient deformation is for stopping the cover at the second position.

The cover mechanism of the present invention can utilize the resilient component to stabilize the cover over the hole or away from the hole according to the triangle linkage theory, which can effectively hold the cover at the predetermined position for protecting the connecting terminal and preventing the dust from falling into the hole. The cover mechanism of the present invention has advantages of simple structure, easy operation, low manufacturing cost and superior assembly yield, so that the electronic device with the cover mechanism can have preferable protection and preferred market competition.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
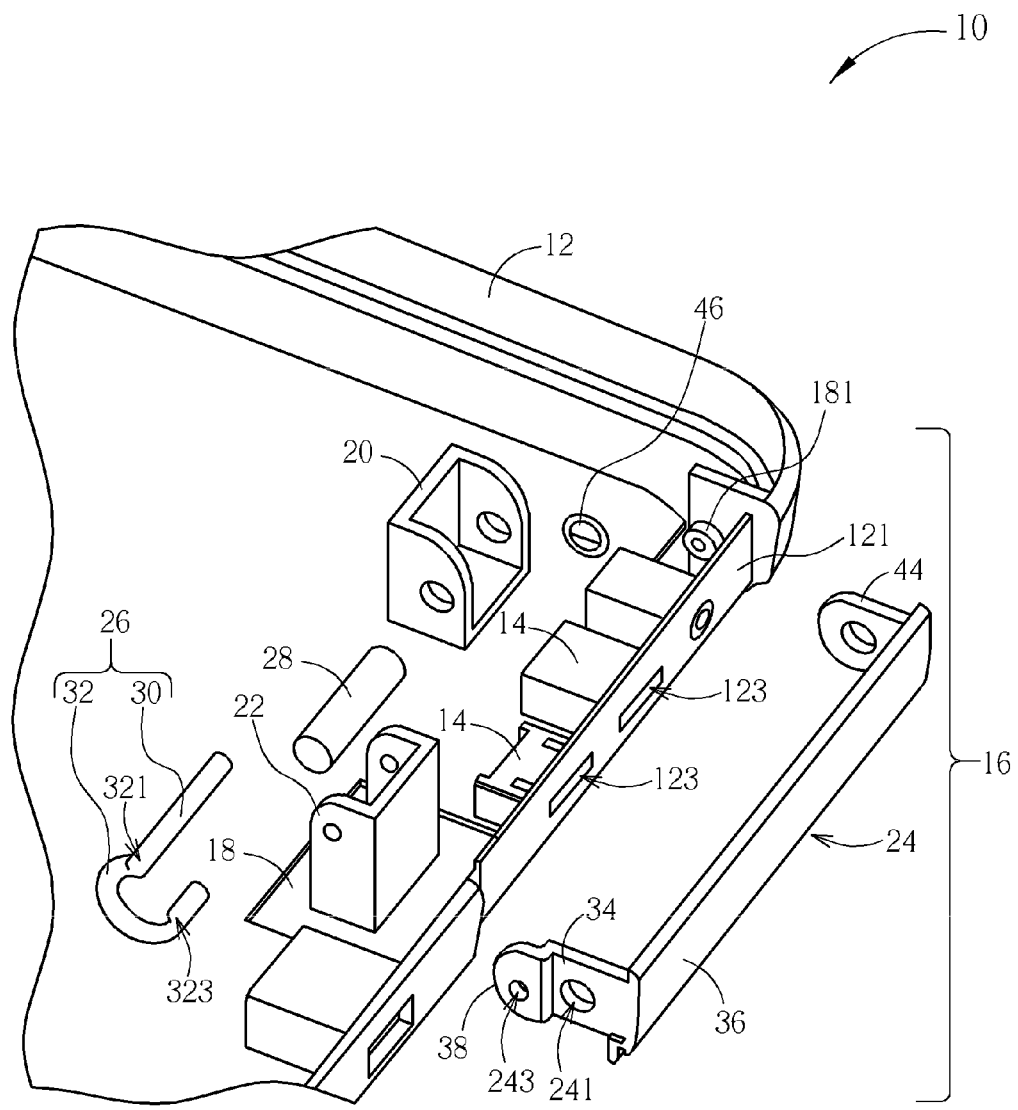
FIG. 1 is an exploded diagram of an electronic device according to an embodiment of the present invention.
Figure 2:
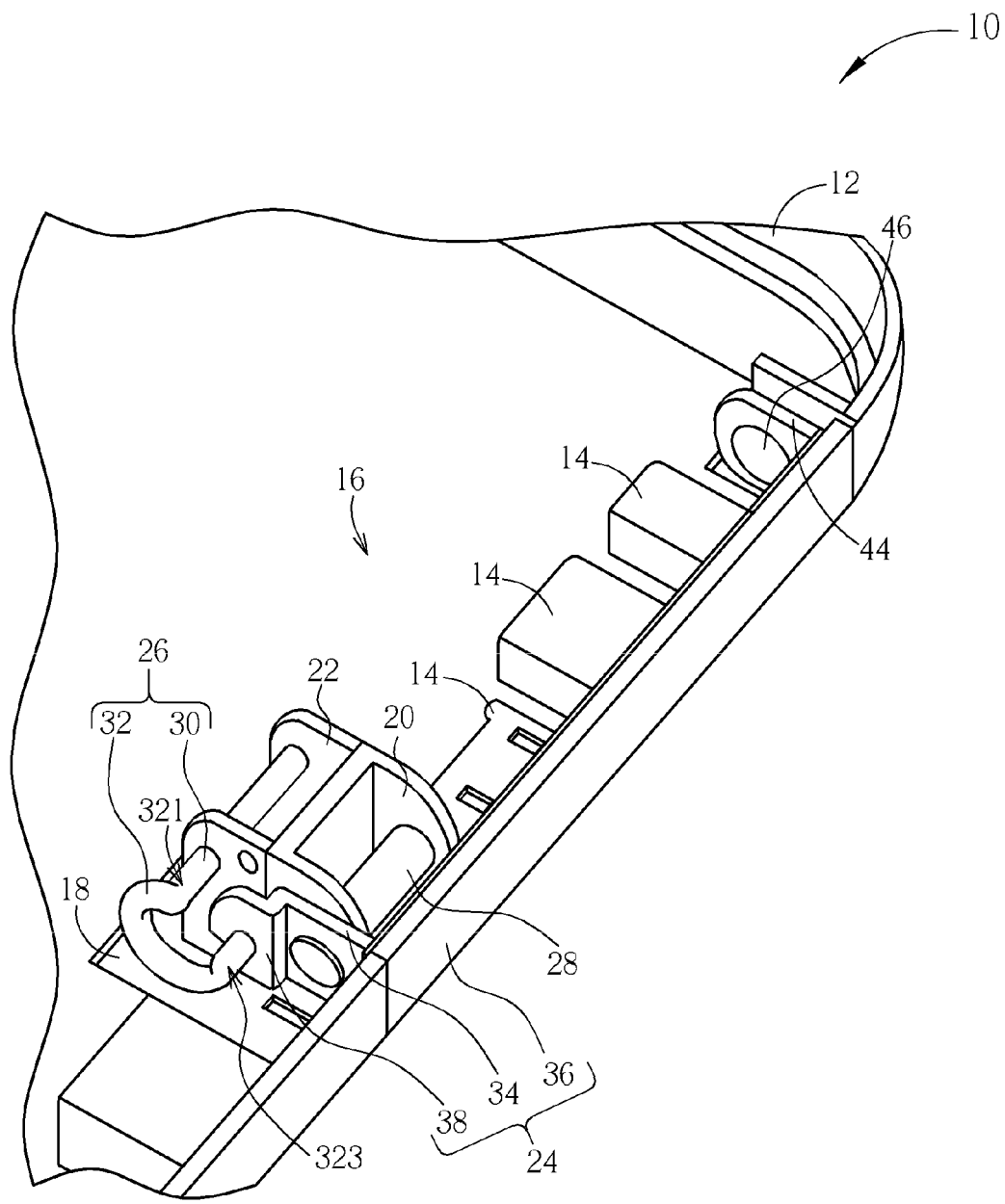
FIG. 2 is an assembly diagram of the electronic device according to the embodiment of the present invention.

Please refer to FIG. 1 and FIG. 2. FIG. 1 is an exploded diagram of an electronic device 10 according to an embodiment of the present invention. FIG. 2 is an assembly diagram of the electronic device 10 according to the embodiment of the present invention. The electronic device 10 includes a casing 12, a plurality of connecting terminals 14 and a cover mechanism 16. At least one hole 123 can be formed on a side wall 121 of the casing 12, and an amount of the hole 123 corresponds to an amount of the connecting terminals 14. Each connecting terminal 14 is disposed inside the casing 12 and faces the corresponding hole 123, so that an external cable can pass through the hole 123 to connect to the corresponding connecting terminal 14. The cover mechanism 16 is disposed on the casing 12. The cover mechanism 16 can cover the hole 123 when the connecting terminal is not in use, so as to prevent dust from falling into the casing 12 via the hole 123. Generally, the electronic device 10 can be a portable electronic product, such as a smart phone, a notebook computer, a tablet computer and so on.

As shown in FIG. 1 and FIG. 2, the cover mechanism 16 includes a base 18, a first holder 20, a second holder 22, a cover 24, a resilient component 26 and a pin 28. The base 18 is disposed inside the casing 12, and the base 18 can be a part of the bottom structure of the casing 12. The first holder 20 and the second holder 22 are respectively disposed on the base 18, and are adjacent to each other preferably. For simplifying arrangement of the cover mechanism 16 of the present invention, the first holder 20 and the second holder 22 can be monolithically integrated design. The pin 28 can be disposed on a pivot hole 241 on the cover 24, so the cover 24 can be pivotably disposed on the first holder 20 by the pin 28, and a part of the cover 24 can be located out of the casing 12 for covering the hole 123 according to user's demand. The cover 24 is at a first position P1 when the cover 24 does not cover the hole 123, and the cover 24 is at a second position P2 when the cover 24 covers the hole 123.

The resilient component 26 can constrain the cover 24 at the first position P1 or at the second position P2. The resilient component 26 includes a shaft 30 and a curved portion 32. The shaft 30 can be a straight rod, which pivots to the second holder 22. A first end 321 of the curved portion 32 is connected to the shaft 30, and a second end 323 of the curved portion 32 different from the first end 321 pivots to a connecting hole 243 on the cover 24. When the cover 24 rotates relative to the first holder 20 for switching between the first position P1 and the second position P2, the curved portion 32 is compressed to generate resilient deformation by the cover 24. In addition, a resilient recovering force of the curved portion 32 by the resilient deformation can push the cover 24 toward the first position P1 or the second position P2 for constraint. Relation between the first position P1 and the second position P2 is described as following paragraph.

Figure 3:
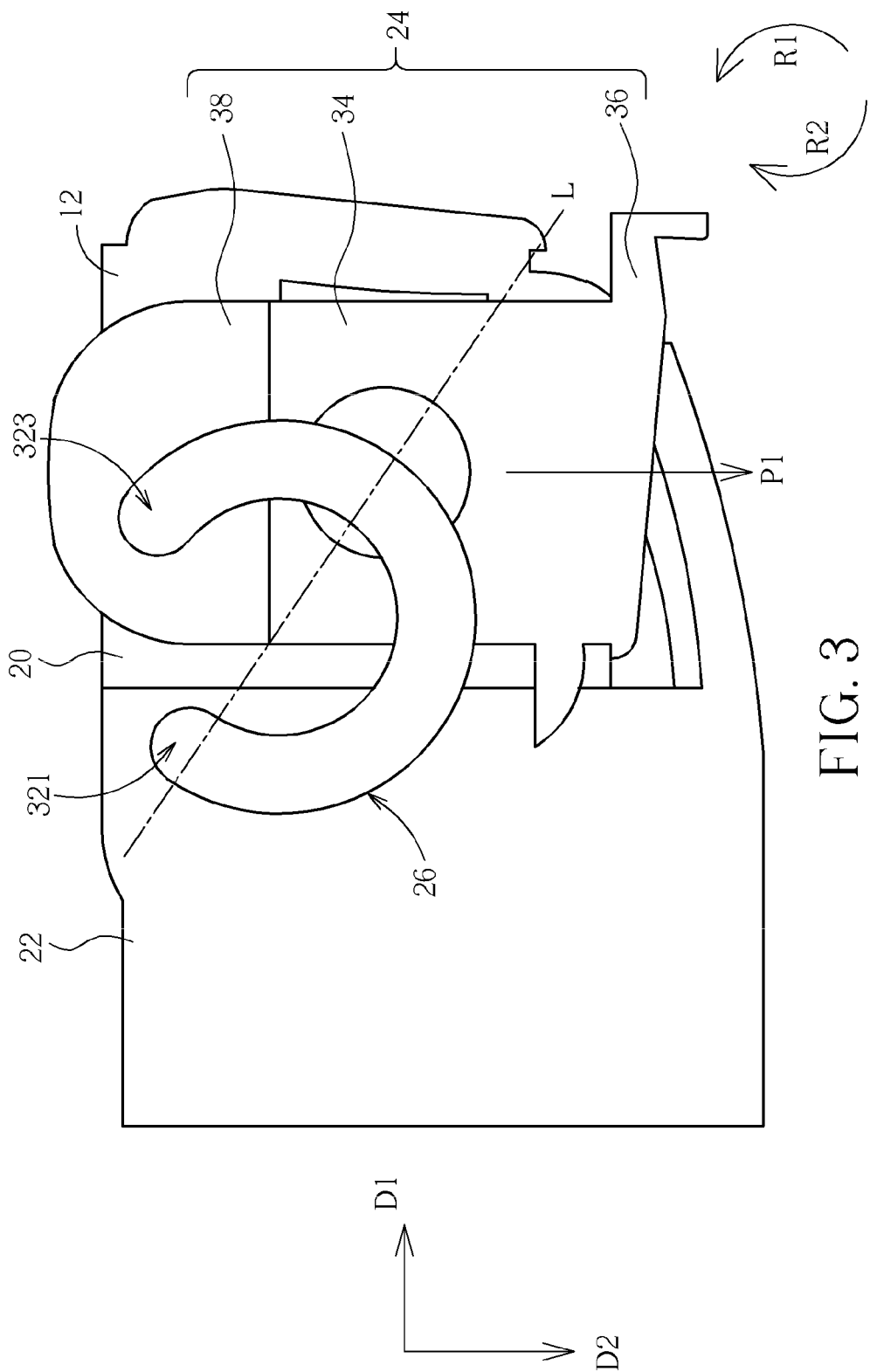
FIG. 3 is a sectional view of a cover of the electronic device at a first position according to the embodiment of the present invention.
Figure 4:
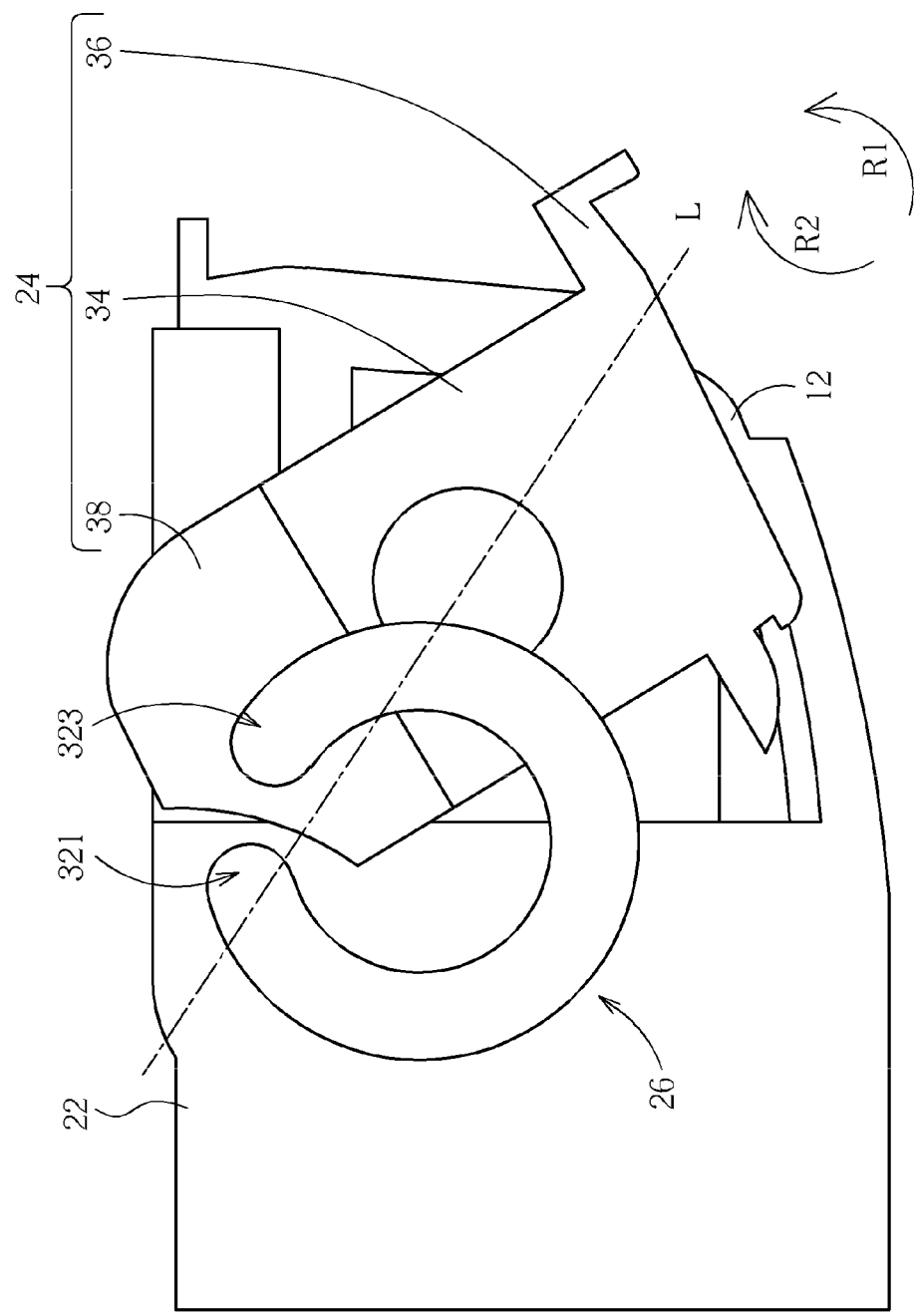
FIG. 4 is a sectional view of the cover of the electronic device between the first position and a second position according to the embodiment of the present invention.
Figure 5:
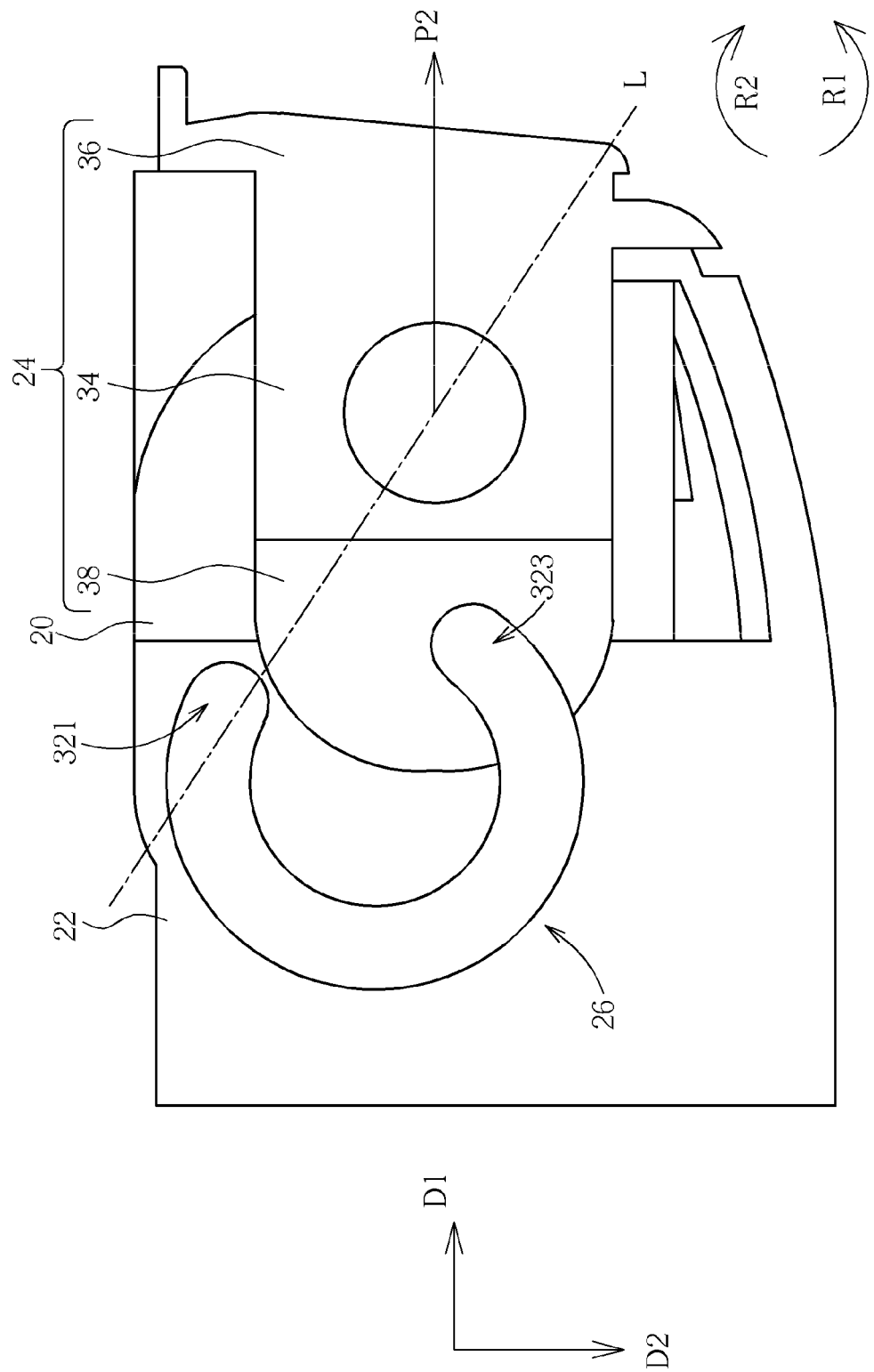
FIG. 5 is a sectional view of the cover of the electronic device at the second position according to the embodiment of the present invention.

Please refer to FIG. 3 to FIG. 5. FIG. 3 is a sectional view of the cover 24 of the electronic device 10 at the first position P1 according to the embodiment of the present invention. FIG. 4 is a sectional view of the cover 24 of the electronic device 10 between the first position P1 and the second position P2 according to the embodiment of the present invention. FIG. 5 is a sectional view of the cover 24 of the electronic device 10 at the second position P2 according to the embodiment of the present invention. As shown in FIG. 1 to FIG. 5, the cover 24 can include a body 34, a board 36 and a driving portion 38. The pivot hole 241 can be formed on a surface of the body 34, so that the body 34 can pivot to the first holder 20 by a combination of the pin 28 and the pivot hole 241. The board 36 can be disposed on a side of the body 34 and located out of the casing 12, and a position of the board 36 relative to the casing 12 can be adjusted for covering or not covering the hole 123 according to user's demand. The connecting hole 243 can be formed on a surface of the driving portion 38. The driving portion 38 is disposed on the other side of the body 34 opposite to the board 36, and the curved portion 32 can be connected to the driving portion 38 by a combination of the second end 323 and the connecting hole 243. The driving portion 38 can push the second end 323 close to the first end 321 when the cover 24 rotates relative to the first holder 20, so as to compress the curved portion 32 to generate the resilient deformation.

As shown in FIG. 3, the resilient component 26 can press the driving portion 38 of the cover 24 along a first direction D1 when the cover 24 is at the first position P1, so as to prevent the cover 24 from separating from the first position P1, which means that the resilient component 26 can constrain the cover 24 from pivoting relative to the first holder 20 along a counterclockwise direction R1. As shown in FIG. 4, the user can press the board 36 to pivot the cover 24 relative to the first holder 20 along the counterclockwise direction R1. The driving portion 38 can push the second end 323 of the curved portion 32 close to the first end 321, which results in the resilient deformation of the curved portion 32, so as to overcome the constraint of the cover 24 by the resilient recovering force of the curved portion 32. As the cover 24 pivots relative to the first holder 20 along the counterclockwise direction R1, the cover mechanism 16 can be switched from the position shown in FIG. 4 to the second position P2 shown in FIG. 5.

After the second end 323 of the curved portion 32 crosses over a line L from the first end 321 to the pivot hole 241, the driving portion 38 stops pressing the curved portion 32, and the resilient recovering force of the curved portion 32 by the resilient deformation can be released to push the second end 323 away from the first end 321, such as moving along a second direction D2 different from the first direction D1. Therefore, the curved portion 32 can be recovered to the initial state, and further can rotate the cover 24 to the second position P2. Method of rotating the cover 24 from the second position P2 to the first position P1 is the above-mentioned operation in reverse, and a detailed description is omitted herein for simplicity.

Figure 6:
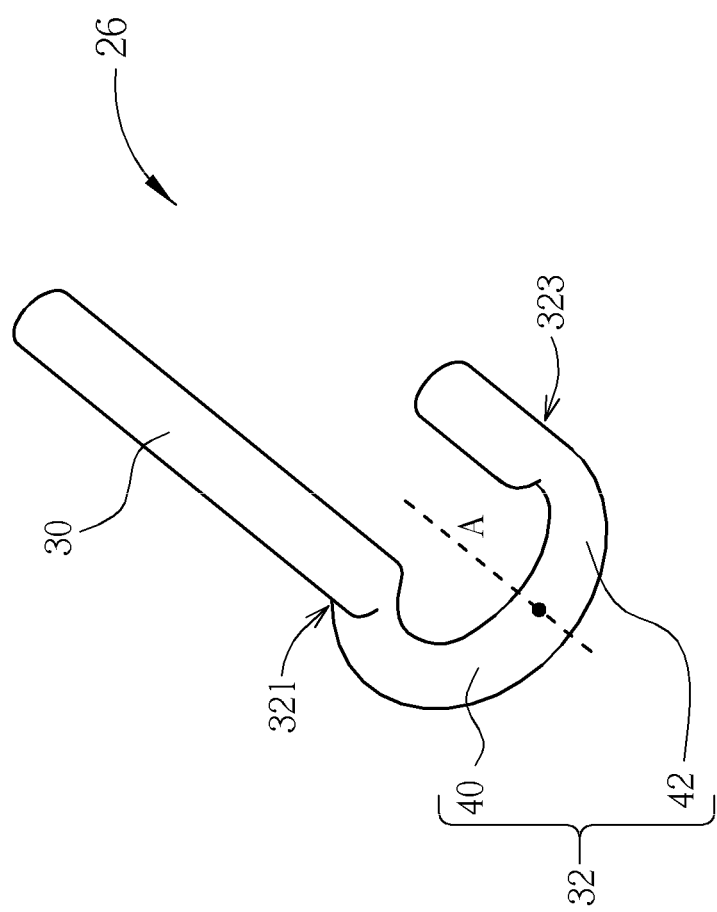
FIG. 6 is a diagram of a resilient component according to the embodiment of the present invention.

Please refer to FIG. 6. FIG. 6 is a diagram of the resilient component 26 according to the embodiment of the present invention. The curved portion 32 of the resilient component 26 can include a first part 40 and a second part 42. An end of the second part 42 can be the second end 323 for pivoting the connecting hole 243 on the cover 24. The first part 40 is disposed between the shaft 30 and the second part 42, and the first part 40 can be connected to the second part 42 through a point A in a resiliently curved manner. As shown in FIG. 6, the shaft 30 and the second end 323 of the resilient component 26 can be respectively disposed on the second holder 22 and the cover 24. When the cover 24 pivots relative to the first holder 20, the cover 24 can utilize the driving portion 38 to press the second end 323 of the resilient component 26, so that the curved portion 32 is compressed into the resilient deformation. Therefore, the second part 42 can be bent relative to the first part 40 at the point A, so as to clear interference of the curved portion 32 and to release the constraint of the cover 24 by the resilient component 26.

As shown in FIG. 3 to FIG. 6, the cover mechanism 16 of the present invention can set the first end 321 and the pivot hole 241 as two fixing fulcrums, and the curved portion 32 and the driving portion 38 can be as two movable linkages. When the cover 24 pivots relative to the first holder 20 along the counterclockwise direction R1 (or the clockwise direction R2), the movable linkage (the curved portion 32) can be resiliently deformed to store energy. An active axle of the movable linkage (the second end 323) moves close to the line L, the second part 42 is compressed and more close to the first part 40. Until the active axle (the second end 323) crosses over the line L, the resilient recovering force of the curved portion 32 can be released to separate the second part 42 away from the first part 40, which means that the curved portion 32 can be recovered to the initial state and simultaneously move the driving portion 38 along the second direction D2 (or the first direction D1), so that the cover 24 can cover the hole 123 completely.

It should be mentioned that the first part 40 and the second part 42 of the present invention can be two arc structures preferably. However, the first part 40 and the second part 42 also can be the other structures with symmetrical shape, such as two straight bar structures. The curved portion composed of two bar structures can be a V-shaped structure. Application of the curved portion 32 of the present invention is not limited to the above-mentioned embodiment, and depends on design demand.

Figure 7:
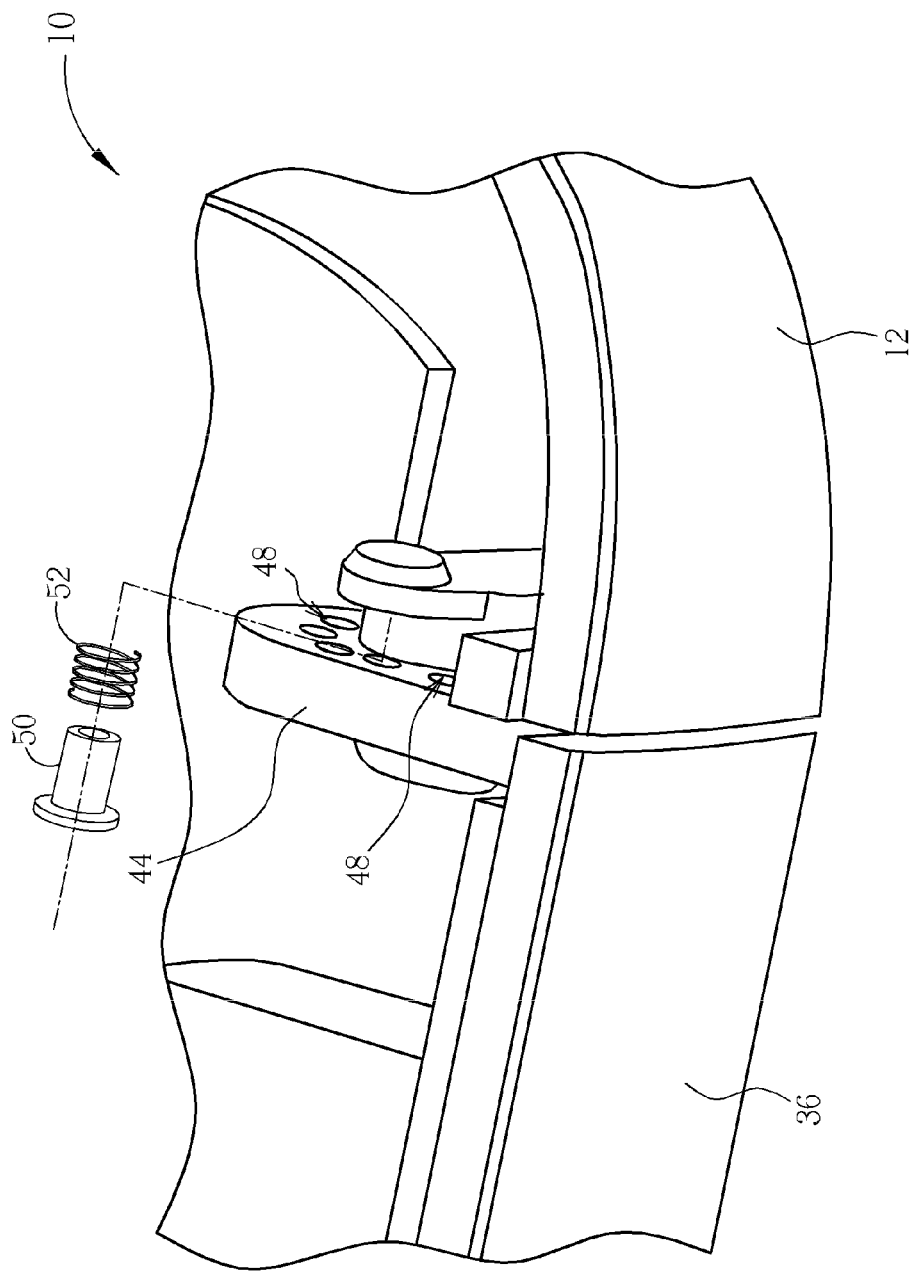
FIG. 7 is an exploded diagram of a part of the electronic device in another view according to the embodiment of the present invention.
Figure 8:
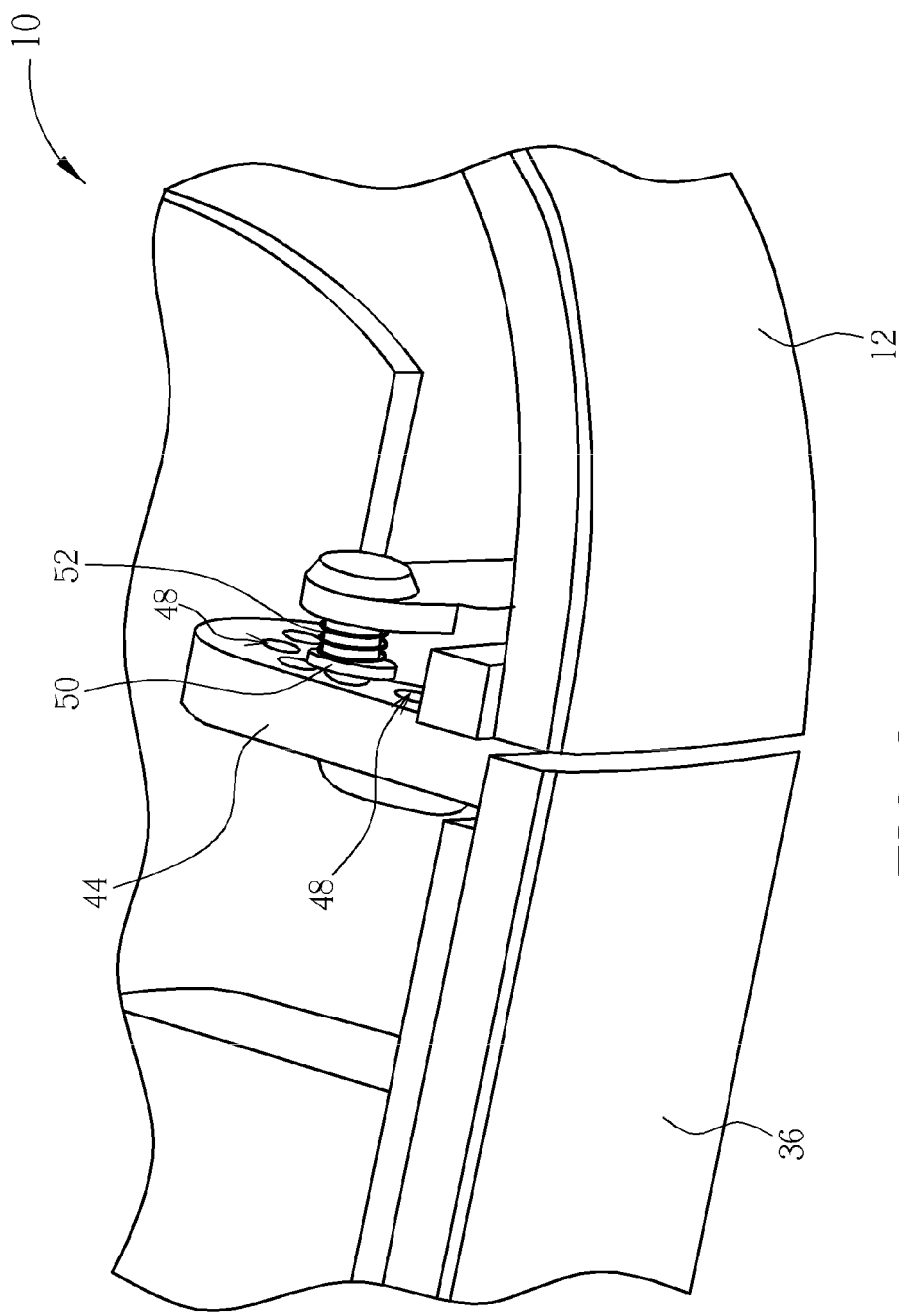
FIG. 8 is an assembly diagram of the part of the electronic device in another view according to the embodiment of the present invention.

Please refer to FIG. 7 and FIG. 8. FIG. 7 is an exploded diagram of a part of the electronic device 10 in another view according to the embodiment of the present invention. FIG. 8 is an assembly diagram of the part of the electronic device 10 in another view according to the embodiment of the present invention. The cover 24 of the electronic device 10 can further include a buckling portion 44 connected to a side of the board 36 different from the driving portion 38. The buckling portion 44 can be pivotably disposed on a boss 181 of the base 18, so as to stably install the cover 24 on the casing 12 with the resilient component 26. The cover mechanism 16 can further include a fixing component 46 for pivoting the buckling portion 44 to the boss 181. The fixing component 46 can be a screw or a bolt.

In addition, a plurality of first engaging parts 48 can be formed on a surface of the buckling portion 44, and the cover mechanism 16 can further include a second engaging part 50 and a spring 52. The second engaging part 50 can be disposed on the boss 181, and a front end of the second engaging part 50 can contact against the first engaging part 48. The spring 52 can be disposed between the second engaging part 50 and the boss 181, so as to tightly engage the second engaging part 50 with the first engaging part 48. The first engaging part 48 can be a sunken structure, and the second engaging part 50 can be a protrusion. The plurality of first engaging parts 48 can be formed on the surface of the buckling portion 44 along an arc curve. When the cover 24 rotates relative to the first holder 20, the second engaging part 50 can be engaged with the corresponding first engaging part 48 according to a rotation angle of the cover 24, so the cover mechanism 16 has multistage rotary function.

In conclusion, the electronic device of the present invention includes the cover mechanism with constraint function, and the present invention can effectively prevent the cover from separating from the hole due to accidental hit or shake. The cover mechanism utilizes the resilient component to install the cover on the casing. The resilient component includes the shaft and the curved portion, and the curved portion can include the first part and the second part. The cover mechanism of the present invention utilizes the triangle linkage theory to set the first end of the resilient component and the pivot hole on the cover as two fixing fulcrums, to set the curved portion and the driving portion of the cover as the movable linkage by the combination of the second end and the connecting hole. When the cover rotates from the first position to the second position (or from the second position to the first position), the driving portion presses the curved portion to move the second part of the curved portion close to the first part, so as to compress the curved portion for releasing the constraint of the cover by the curved portion.

As the rotation angle of the cover is increased, the active axle of the movable linkage (the second end of the curved portion) can cross over the line formed by the fixing fulcrums, the driving portion does not press the curved portion, and the resilient recovering force of the curved portion by the resilient deformation can be completely released to unfold the triangle linkage. Three corners of the triangle linkage can respectively be the first end, the pin inside the pivot hole, and the second end inside the connecting hole. Thus, the second part can be separated from the first part for recovering the curved portion to the initial state and constraining the cover at the second position (or the first position).

Besides, the cover mechanism of the present invention can further utilize the combination of the second engaging part on the boss and the first engaging part of the buckling portion to constrain the pivot of the cover relative to the first holder. The spring installed on the second engaging part can push the second engaging part to tightly contact the first engaging part. Therefore, the plurality of first engaging parts can be formed on the buckling portion according to the predetermined rotation angle of the cover of the present invention. When the cover rotates to the first position and the second position, the second engaging part can be engaged with the corresponding first engaging part, so as to constrain a movement of the cover with the resilient component.

Comparing to the prior art, the cover mechanism of the present invention can utilize the resilient component to stabilize the cover over the hole or away from the hole according to the triangle linkage theory, which can effectively hold the cover at the predetermined position for protecting the connecting terminal and preventing the dust from falling into the hole. The cover mechanism of the present invention has advantages of simple structure, easy operation, low manufacturing cost and superior assembly yield, so that the electronic device with the cover mechanism can have preferable protection and preferred market competition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cover mechanism for covering a hole on a casing, the cover mechanism comprising:
    a base;
    a first holder disposed on the base;
    a second holder disposed on base and adjacent to the first holder;
    a cover pivotably disposed on the first holder, the cover pivoting relative to the first holder for rotating from a first position to a second position, a connecting hole being formed on the cover, and
    a resilient component for constraining the cover at the second position, the resilient component comprising:
        a shaft pivoting to the second holder; and
        a curved portion, a first end of the curved portion being connected to the shaft, a second end of the curved portion different from the first end pivoting to the cover via the connecting hole, the cover driving the curved portion to generate resilient deformation when rotating from the first position to the second position, and a resilient recovering force of the curved portion by the resilient deformation being for stopping the cover at the second position.

2. The cover mechanism of claim 1, further comprising:
    a pin disposed on a pivot hole on the cover, the cover pivoting to the first holder by the pin.

3. The cover mechanism of claim 2, wherein the second end of the curved portion is separated from the first end by the resilient recovering force when passing through a line from the first end to the pivot hole.

4. The cover mechanism of claim 2, wherein the cover comprises:
    a body pivoting to the first holder, the pivot hole being formed on the body;
    a board disposed on a side of the body for covering the hole; and
    a driving portion disposed on the other side of the body opposite to the board, the connecting hole being formed on the driving portion, the driving portion being connected to the second end of the curved portion for pushing the second end close to the first end, so as to compress the curved portion to generate the resilient deformation.

5. The cover mechanism of claim 1, wherein the second end is separated from the first end by the resilient recovering force of the curved portion, so as to recover the curved portion to an initial state and to rotate the cover at the second position.

6. The cover mechanism of claim 4, wherein the cover further comprises:
    a buckling portion connected to a side of the board different from the driving portion and pivotably disposed on a boss of the base.

7. The cover mechanism of claim 6, wherein the cover mechanism further comprises a fixing component, and the buckling portion pivots to the boss by the fixing component.

8. The cover mechanism of claim 6, wherein the buckling portion comprises at least one first engaging part, the cover mechanism further comprises a second engaging part and a spring, the spring is disposed between the second engaging part and the boss for engaging the second engaging part with the first engaging part.

9. The cover mechanism of claim 6, wherein the curved portion comprises a first part and a second part, the first part is disposed between the shaft and the second part, the second part is disposed between the cover and the first part, and the first part is connected to the second part in a resiliently curved manner.

10. The cover mechanism of claim 9, wherein the first part and the second part are arc structures or bar structures.

11. An electronic device comprising:
    a casing, a hole being formed on a side wall of the casing;
    a connecting terminal disposed inside the casing and facing the hole; and
    a cover mechanism disposed on the casing for covering the hole, the cover mechanism comprises:
        a base;
        a first holder disposed on the base;
        a second holder disposed on base and adjacent to the first holder;
        a cover pivotably disposed on the first holder and partly exposed out of the casing, the cover pivoting relative to the first holder for rotating from a first position to a second position, a connecting hole being formed on the cover, and
        a resilient component for constraining the cover at the second position, the resilient component comprising:
            a shaft pivoting to the second holder; and
            a curved portion, a first end of the curved portion being connected to the shaft, a second end of the curved portion different from the first end pivoting to the cover via the connecting hole, the cover driving the curved portion to generate resilient deformation when rotating from the first position to the second position, and a resilient recovering force of the curved portion by the resilient deformation being for stopping the cover at the second position.

12. The electronic device of claim 11, wherein the cover mechanism further comprises:
    a pin disposed on a pivot hole on the cover, the cover pivoting to the first holder by the pin.

13. The electronic device of claim 12, wherein the second end of the curved portion is separated from the first end by the resilient recovering force when passing through a line from the first end to the pivot hole.

14. The electronic device of claim 12, wherein the cover comprises:
    a body pivoting to the first holder, the pivot hole being formed on the body;
    a board disposed on a side of the body and located out of the casing for covering the hole; and
    a driving portion disposed on the other side of the body opposite to the board, the connecting hole being formed on the driving portion, the driving portion being connected to the second end of the curved portion for pushing the second end close to the first end, so as to compress the curved portion to generate the resilient deformation.

15. The electronic device of claim 11, wherein the second end is separated from the first end by the resilient recovering force of the curved portion, so as to recover the curved portion to an initial state and to rotate the cover at the second position.

16. The electronic device of claim 14, wherein the cover further comprises:

a buckling portion connected to a side of the board different from the driving portion and pivotably disposed on a boss of the base.

17. The electronic device of claim 16, wherein the cover mechanism further comprises a fixing component, and the buckling portion pivots to the boss by the fixing component.

18. The electronic device of claim 16, wherein the buckling portion comprises at least one first engaging part, the cover mechanism further comprises a second engaging part and a spring, the spring is disposed between the second engaging part and the boss for engaging the second engaging part with the first engaging part.

19. The electronic device of claim 16, wherein the curved portion comprises a first part and a second part, the first part is disposed between the shaft and the second part, the second part is disposed between the cover and the first part, and the first part is connected to the second part in a resiliently curved manner.

20. The electronic device of claim 19, wherein the first part and the second part are arc structures or bar structures.

* * * * *